UNITED STATES PATENT OFFICE.

JACOB STAUDT, OF BONN, GERMANY.

PROCESS OF MANUFACTURING ARTIFICIAL STONE.

No. 797,624.　　　　Specification of Letters Patent.　　　　Patented Aug. 22, 1905.

Application filed August 3, 1904. Serial No. 219,369.

*To all whom it may concern:*

Be it known that I, JACOB STAUDT, chemist, a subject of the German Emperor, residing at 64 Arndtstrasse, Bonn, Germany, have invented certain new and useful Improvements in Processes of Manufacturing Artificial Stone, of which the following is a specification.

This invention relates to a process for manufacturing artificial stone, of which the following is a specification.

Hitherto a process has been known for manufacturing artificial stone in which a mixture of sand and chalk, to which twenty-five per cent. of linseed-oil varnish has been added, is pressed into molds and dried for eight days at a temperature of 100° to 150° centigrade.

In spite of the extremely long duration of the drying and hardening period of the process referred to stones or blocks of but moderate hardness and inconsiderable strength and toughness result from its employment and because of the character of the drying operation (which really consists in the hardening of the cementing medium from without inward) stones or blocks of but small sizes can be produced and only such cementing mediums can be used as harden readily—as, for instance, the fatty varnishes. To reduce the duration of the drying period to any considerable extent in this prior process by increasing the drying temperature results merely in giving to the stones or blocks a hard exterior crust, while within they remain soft. This exterior crust (more especially when a high proportion of the binding medium is used) presents a rough and blistered appearance and the stones or blocks themselves lose their shape and become distorted. The higher the temperature employed the more accentuated become the inherent difficulties referred to. If, however, the duration of the drying period in that process is reduced to a considerable extent, then the stones receive a hard crust outside while remaining soft inside. The outside crust, more particularly when a high proportion of binding medium is used, appears rough and blistery, while the stones themselves lose their shape and become distorted. If, on the other hand, still higher temperatures are employed, the drawbacks in question become accentuated and no better result is attained as regards the hardening.

This invention relates to a process by means of which it is possible to produce such artificial stone of much greater hardness, strength, and toughness in a considerably shorter time without the disadvantages hereinbefore mentioned. The process, moreover, permits the manufacture of stones of larger size, as well as the use of all those oily and fatty cementing mediums which have the property of becoming converted into a hard mass when exposed in the form of thin layers to the action of air and heat as the result of a chemical reaction. These are preferably those fats and oils, as well as their varnishes, which consist of the more or less complex compounds of glycerids of fatty acids, and also compounds of fatty acids of the group of animal and vegetable waxes related to the fats, and finally the heavy rosinoils.

The process consists in commencing the chemical reactions which result in the hardening of the cementing substances before the molding and carrying them out to such an extent as is permitted by the necessity of keeping the mixture in a plastic state. This is effected by exposing the mixed materials, which consist of the binding substances and the filling substances ground more or less finely and which constitute a moist powder, to the action of air at a suitable temperature, the loose powdery nature of the said mass facilitating the commencement and the continuance of the chemical processes which take place.

This process differs considerably from the well-known stiffening of oil-putty or cement by simply leaving about masses kneaded into hard cakes. In that case the outer crust sets into a crumbly mass, the interior remaining unaffected. By repeated kneading it is possible, it is true, to attain a slight stiffening, but it never can be very thorough, as a large proportion of the set crust would affect the cohesion of the cement or binding medium. Another method of stiffening cement is based on the chemical reaction between suitably-selected filling materials and the cements. This reaction between solid and viscous substances takes place, however, in such an extraordinarily slow manner that the stiffening in question necessitates leaving the material for days and weeks, while by the process of this invention a fairly thorough stiffening can be obtained in a few hours. In this way it is possible to prepare the mixture of materials without affecting their plasticity for final hardening after the molding in such a way that even in the case of large stones when sufficient heat is used the said hardening takes place uniformly throughout the whole of the mass in twelve to twenty-four hours, and the products thus obtained, in spite of the short time of manufacturing, are distinguished by great hardness, strength, and toughness. The character of the chemical reactions which take place in the cement during the hardening process is not yet fully ascertained. It is probable that oxidation plays a prominent part in what occurs and that such new compounds as are produced thereby are again partially disassociated and volatilized. For all practical purposes the resultant gradual conversion of the cement from the liquid into the solid state may be appropriately designated as a "stiffening" of the mixture.

When the so-called "siccative oils" are used as cement—such as, for instance, linseed-oil and its varnishes—when they are not added in excessive quantities this stiffening process can be started at the ordinary room temperature (15° to 20° centigrade) and is then completed in twelve to twenty-four hours. By using suitable higher temperatures the process is considerably accelerated, even when large quantities of cement are added. When the so-called "non-siccative oils" are used, as well as consistent fats and waxes, the stiffening should preferably be effected after a more or less considerable heating. The temperature and time suitable for stiffening differ for different kinds of cements and must be determined by experiment for each individual case. The following, for instance, have been ascertained: linseed-oil varnish, 60° to 80° centigrade and two to three hours; raw linseed-oil, 80° to 100° centigrade and three to four hours; rape-seed oil, 90° to 110° centigrade and four to five hours; blubber-oil, 100° to 120° centigrade and five to six hours; tallow, 110° to 130° centigrade and six to seven hours; palm-oil, 120° to 140° centigrade and seven to eight hours.

As already stated, the stiffening process must be interrupted below a certain limit in order that the plasticity of the mixture may be preserved. As will be seen from the examples given above, this limit is reached for different cements at different periods of time and at different temperatures. Generally speaking, the proper moment can be recognized by a pungent smell becoming noticeable in the mixtures. Then the process must be stopped; otherwise the cement would become partly decomposed and the mixtures would lose their plasticity and soon pass into a hard sandy state. The time required for stiffening the mixture may be reduced considerably by increasing the stiffening temperatures beyond those stated in the foregoing specific instances, the necessary precautions being taken to prevent burning. For example, mixtures of filling substances and well-hardening oils may be stiffened within fifteen to twenty minutes when heated to a temperature from 140° to 150° centigrade. In fact the duration of the stiffening operation may be considerably reduced in any of the instances mentioned. As soon as the proper degree of stiffening has been reached the mixtures, either in the hot or in the cooled state, form loose powdery masses, which no longer feel moist to the touch, but which can still be easily formed into bodies by pressure. Solid fats behave in exactly the same way as oils, and mixtures prepared with them do not get solid on being cooled. The mixtures can therefore be treated both in a hot and in a cooled state, and there is no need to fear that a reduction of temperature during the molding will be disadvantageous. As cold material is easier to treat than hot, it is even advisable to cool the mixtures down to a certain degree.

Solid fats and waxes are melted before being mixed with filling substances and the latter correspondingly heated. As the stiffening temperatures of solid fats and waxes are beyond their melting-point, they can be considered before the stiffening as liquids and as behaving in exactly the same manner as oils.

By strongly boiling the so-called "siccative" oils with or without addition of certain chemicals varnishes are produced, as is well known, which are more or less viscous and can be considered as cements which have already been stiffened to a certain extent independently of the filling materials. According to their nature these varnishes, in order to enable them to be mixed with filling material, must be more or less diluted. To that end very thin fluid additions are used, which when heated evaporate again before the proper stiffening process of the cement in combination with the filling material has been completed to the desired degree.

As filling material for the process of this invention can be used various raw materials ground more or less finely—that is to say, generally speaking, all substances which can be ground sufficiently fine or occur in a sufficiently fine state, as long as they are not, or only with difficulty, soluble in water and as long as they do not undergo such modification as to make the molding of the stiffened powder impossible and are capable of withstanding the temperature required for hardening.

The proportion of cement in the case of very high pressure being used for molding can be made very small, (down to five per cent;) but with sufficiently long stiffening it can be raised to twenty per cent. and more. It is, however, not necessary to have such a high proportion of cement, as stones of great hardness and resistance to water can be obtained at a medium pressure with a proportion of cement equal to ten to fifteen per cent., by volume, if suitable temperatures be used. The temperatures, however, which must be used after the molding for completing the hardening of the stones differ to a certain extent with the different cements, but not within such wide limits as the stiffening temperatures.

At a temperature of 110° to 120° centigrade the stones are already, it is true, fairly tough, but still of but moderate hardness and absorb water at the breaking joints. The so-called "siccative" oils and their varnishes give very good results at temperatures varying between 120° and 130° centigrade, while other oils require a slightly higher and solid fats still higher hardening temperature. Generally speaking, the best results are obtained with temperatures of about 150° to 180° centigrade; but the stiffening temperature and the duration of stiffening depend not only on the kind, but also on the quantity of cement and also on the nature of the filling used, so that the temperatures stated above must be varied to a greater or less extent in accordance with the circumstances of each individual case. As, generally speaking, the duration of the stiffening process is the shorter the higher the temperature, the temperature can often be considerably raised, all other conditions remaining the same; but then precautions must be taken against burning. At very high temperatures, exceeding 200° centigrade, the hardness begins to decrease again until the cement is finally destroyed.

The choice of the filling to be used depends on the object for which the stone to be manufactured is to be used. If it is intended to produce insulating bodies for electrotechnical purposes, then fine quartz-sand, quartz-powder, ground feldspar or lime spar, ground glass, and other insulating substances can be used. For manufacturing grinding or polishing stones it is advisable to use as filling more or less finely ground raw materials used for grinding and polishing purposes, such as emery, carborundum, Vienna lime, and the like. If it is desired to produce colored stones, then it is advisable to mix in a suitable proportion filling substances which affect the coloration as little as possible—as, for instance, quartz-meal, ground feldspar, lime spar, bright clay, and the like, with the well-known body-colors such, for instance, as are used in the cement-plate manufacture. Such mixtures of color can also be put on in a thin layer by pressing on the ground mass mainly consisting of screened quartz-sand, and in this way splendidly-colored plates with beautiful patterns may be produced. If the stone is to be used for some other object, then the filling must be selected accordingly.

In accordance with the above description the process may be carried out, say, as follows: In an earthen vessel are mixed one kilogram fine quartz-meal, such as is used as addition to the material in the manufacture of pottery, and one-half kilogram pure quartz-sand previously screened through a screen with sixty-four meshes per inch, while thoroughly agitating the mixture by means of a small metal spade. Thereupon one hundred and fifty grams of raw commercially pure linseed-oil are poured in, the whole thoroughly well stirred with a wooden spade, kneaded with the hand in order to make the mixture more uniform, and rubbed so as to disintegrate any hard lumps that may have formed, and to obtain a loose moist powder, and the mixture is first screened through a sieve of twelve meshes and then through one of twenty-four meshes per inch. The moist powder is then spread on a flanged metal plate in a thin layer about one centimeter deep and brought into the heating-chamber, in which the temperature is maintained at 85° centigrade by means of hot air. After leaving it there for two hours the mixture loses its moist nature and the stiffening process is at an end. The metal plate is then removed from the heating-chamber and the mixture cooled. After having rubbed it again through a screen with twenty-four meshes per inch in order to loosen any particles that may have baked together and to obtain perfect uniformity a final product is obtained in the shape of a dry powder which is no longer smeary, but which can still be compressed by strong pressure. The material is then filled into molds of a spindle-press, the fly-wheel of which is moved by hand or by power, according to its size, and the pressure is exercised by turning the spindle, whereby a plunger is caused to descend in the well-known manner. After completing the pressure the stones are ejected from the mold by means of an ejector device placed on perforated metal plates and introduced into a heating-chamber. The temperature of the said chamber is raised within six hours to 160° centigrade by admitting hot air. This temperature is kept up during six hours, and during the further six hours cooled down to such an extent that the stones which at that time are perfectly ready and quite hard can be taken out.

The stiffened powder constitutes a suitable material for manufacturing complicated parts by dry pressure, as it can be pressed into the finest outlines without adhering to the mold when the molded part is taken out.

Stone produced by the process hereinbefore described is distinguished by extraordinary strength, toughness, and resistance to water, which render it thoroughly suitable for various purposes. Thus, for instance, by selecting suitable filling it can be used for manufacturing insulators for electrotechnical purposes, for grinding and polishing stones, and the like.

What I claim as my invention, and desire to secure by Letters Patent, is—

1. The herein-described process of making artificial stone, which consists in mixing a comminuted filling material with an oxidizable binding agent in quantity sufficient to produce a moist loose powder, stiffening said powder by exposing it to the action of the air, and thereafter molding the mixture into stone; substantially as described.

2. The herein-described process of making artificial stone, which consists in mixing a comminuted filling material with an oxidizable binding agent in quantity sufficient to produce a moist loose powder, stiffening said powder by exposing it in thin layers to the action of the air, and thereafter molding the mixture into stone; substantially as described.

3. The herein-described process of making artificial stone, which consists in mixing a comminuted filling material with an oily binding agent in quantity sufficient to produce a moist loose powder, stiffening said powder by exposing it to the action of the air, and thereafter molding the mixture into stone; substantially as described.

4. The herein-described process of making artificial stone, which consists in mixing a refractory insoluble powdery filling substance with from five per cent. to twenty per cent. of an oily binding medium so as to produce a moist loose powder, stiffening said powder without destroying its plasticity, and thereafter molding the mixture into stone, the hardening of the stone being accelerated by baking; substantially as described.

5. The herein-described process of making artificial stone, which consists in mixing a refractory insoluble powdery filling substance with from five per cent. to twenty per cent. of an oily binding medium so as to produce a moist loose powder, stiffening said powder without destroying its plasticity, and thereafter molding the mixture into stone, the hardening of the stone being accelerated by baking at a temperature as high as 200° centigrade for twelve to twenty-four hours; substantially as described.

6. The herein-described process of making artificial stone, which consists in mixing powdered quartz-meal and quartz-sand with from five per cent. to twenty per cent. of linseed-oil, rubbing and screening the mixture into the form of a moist loose powder, heating the mixture to stiffen it without destroying its plasticity and thereafter molding the mixture into stone, substantially as described.

7. The herein-described process of making artificial stone, which consists in mixing powdered quartz-meal and quartz-sand with from five per cent. to twenty per cent. of linseed-oil, rubbing and screening the mixture into the form of a moist loose powder, heating the mixture in a thin layer to stiffen it without destroying its plasticity and thereafter molding the mixture into stone, the hardening of the stone being accelerated by baking it at a temperature as high as 200° centigrade for twelve to twenty-four hours; substantially as described.

In testimony whereof I have signed my name to this specification in presence of two witnesses.

JACOB STAUDT.

Witnesses:
WILLIAM KNEPPERS,
JOH. SCHOLZ.